(12) United States Patent  (10) Patent No.: US 7,090,271 B2
Halvorsen, Jr.  (45) Date of Patent: Aug. 15, 2006

(54) CONFORMABLE SLING FOR MOVING OBJECTS

(76) Inventor: Leif A. Halvorsen, Jr., 205 S. 6th St., Flagler Beach, FL (US) 32136

( * ) Notice: Subject to any disclaimer, the term of this patent is extended or adjusted under 35 U.S.C. 154(b) by 63 days.

(21) Appl. No.: 10/898,850

(22) Filed: Jul. 26, 2004

(65) Prior Publication Data

US 2006/0017299 A1 Jan. 26, 2006

(51) Int. Cl.
*A45F 5/00* (2006.01)
(52) U.S. Cl. ..................................... 294/152; 294/153
(58) Field of Classification Search ............... 294/74, 294/140, 149, 152, 153, 156, 15; 5/625–628; 224/157, 265, 266, 270
See application file for complete search history.

(56) References Cited

U.S. PATENT DOCUMENTS

| 664,774 | A | | 12/1900 | Palmer |
| 913,750 | A | | 3/1909 | Meyer |
| 935,445 | A | | 9/1909 | Wolf |
| 1,314,397 | A | | 8/1919 | Heffron |
| 1,325,025 | A | | 12/1919 | Linnertz |
| 1,367,976 | A | | 2/1921 | Jacobson |
| 2,508,795 | A | * | 5/1950 | Nielsen ..................... 294/152 |
| 2,827,949 | A | | 3/1958 | Kershaw |
| 3,426,367 | A | * | 2/1969 | Bradford ....................... 5/626 |
| 3,843,979 | A | | 10/1974 | Treace |
| 4,021,868 | A | | 5/1977 | Fueslein |
| 4,210,244 | A | * | 7/1980 | Westrick ..................... 206/373 |
| 4,421,352 | A | | 12/1983 | Raue et al. |
| 4,452,657 | A | | 6/1984 | Hamm |
| 4,850,629 | A | | 7/1989 | St. Germain |
| 4,952,450 | A | | 8/1990 | Noel |
| D323,730 | S | | 2/1992 | Burney |
| 5,352,007 | A | * | 10/1994 | Kirsch |
| 5,688,011 | A | * | 11/1997 | Gulley ........................ 294/74 |
| 5,823,594 | A | * | 10/1998 | Hayes et al. ................ 294/142 |
| 6,003,929 | A | | 12/1999 | Birdsell |
| 6,299,953 | B1 | | 10/2001 | Meier et al. |
| 6,565,101 | B1 | | 5/2003 | Jones, Jr. et al. |
| 6,908,131 | B1 | * | 6/2005 | Main et al. ................. 294/150 |
| 2002/0105199 | A1 | | 8/2002 | Formanek et al. |

FOREIGN PATENT DOCUMENTS

| JP | 200109120 A2 | 4/2000 |
| RU | 2 104 512 C1 | 3/1996 |
| WO | WO 81/02151 | 8/1981 |

\* cited by examiner

*Primary Examiner*—Dean J. Kramer
(74) *Attorney, Agent, or Firm*—Steven J. Rosen (57) ABSTRACT

An exemplary embodiment of a sling for moving objects includes a sheet of flexible material having opposite first and second sides, longitudinally spaced apart transversely extending first and second side edges, transversely spaced apart longitudinally extending third and fourth side edges, transversely extending first and second edge loops along the first and second side edges respectively, and transversely extending intermediate loops attached to the sheet and longitudinally spaced apart between the first and second side edges. First and second elongated element may be disposed through first and second one of the loops, respectively, and cut-out sections positioned between distal ends of the loops. A more particular embodiment of the sheet includes longitudinally extending edge loops attached along the third and fourth side edges, longitudinally extending intermediate loops attached to the second side, and the transversely extending intermediate loops attached to the first side.

15 Claims, 9 Drawing Sheets

CONFORMABLE SLING FOR MOVING OBJECTS

BACKGROUND OF THE INVENTION

Field of the Invention

The present invention relates generally to devices for carrying and moving and, more particularly, slings used for carrying or moving objects.

Harnesses have typically been used to enable two men to more easily lift and carry heavy objects such as refrigerators, stoves, washer/dryers, large loaded crates and the like. The objects are typically suspended from the workers' shoulders by straps of the harness wherein the straps carry the load. Various features of the harnesses have been developed to secure the object to the harness and prevent the sliding of the straps off the object. Various hooks and tension buckles are used to secure the object to the harness.

The mounting of the harness is often time consuming and difficult and an error can lead to slipping and dropping of the object. They are also expensive and cumbersome making storage difficult. They are also difficult to attach to odd shaped objects that are not rectangularly shaped and have non-square corners. Harnesses are often difficult to attach to bulky and odd shaped objects because the straps must be attached to the objects, so that when the object is lifted, the center of gravity of the object doesn't cause the object to shift, causing the men lifting and carrying the object to lose their balance and possibly stumble or fall.

It is, thus, desirable to have a device for lifting and carrying and moving objects, particularly objects that are bulky and oddly shaped, in a manner that is easy and that will prevent the object from dangerously shifting its center of gravity. It is also desirable for this lifting and carrying device to be easily attached to the object being moved and be easily stowed and maintained.

BRIEF DESCRIPTION OF THE INVENTION

A sling suitable for moving heavy odd shaped objects includes a sheet of flexible material having opposite first and second sides, longitudinally spaced apart transversely extending first and second side edges, transversely spaced apart longitudinally extending third and fourth side edges, transversely extending first and second edge loops along the first and second side edges, respectively, and transversely extending intermediate loops attached to the sheet and longitudinally spaced apart between the first and second side edges.

In an exemplary embodiment of the sling, the intermediate loops are attached to the sheet on at least one of the first and second sides. A first elongated element is disposed through a first one of the loops and a second elongated element is disposed through a second one of the loops. The elongated elements are longer than the first and second loops and having handle end sections extending beyond the first and second loops by which the elongated elements can be grasped. In a more particular embodiment of the sheet longitudinally extending edge loops are attached along the third and fourth side edges, longitudinally extending intermediate loops are attached to the second side, and the transversely extending intermediate loops are attached to the first side. The sheet is rectangular in shape and the longitudinally extending third and fourth side edges are longer than the transversely extending first and second side edges.

The sling allows two or more men to lift, carry, and move objects, particularly objects that are bulky and oddly-shaped, in a manner that is easy and that will prevent the object from dangerously shifting its center of gravity. The sling is easily attached to the object being moved and is easily stowed and maintained. The sling also easily adapts to different objects having different shapes, sizes, and weights.

DETAILED DESCRIPTION OF THE INVENTION

Figure 1:
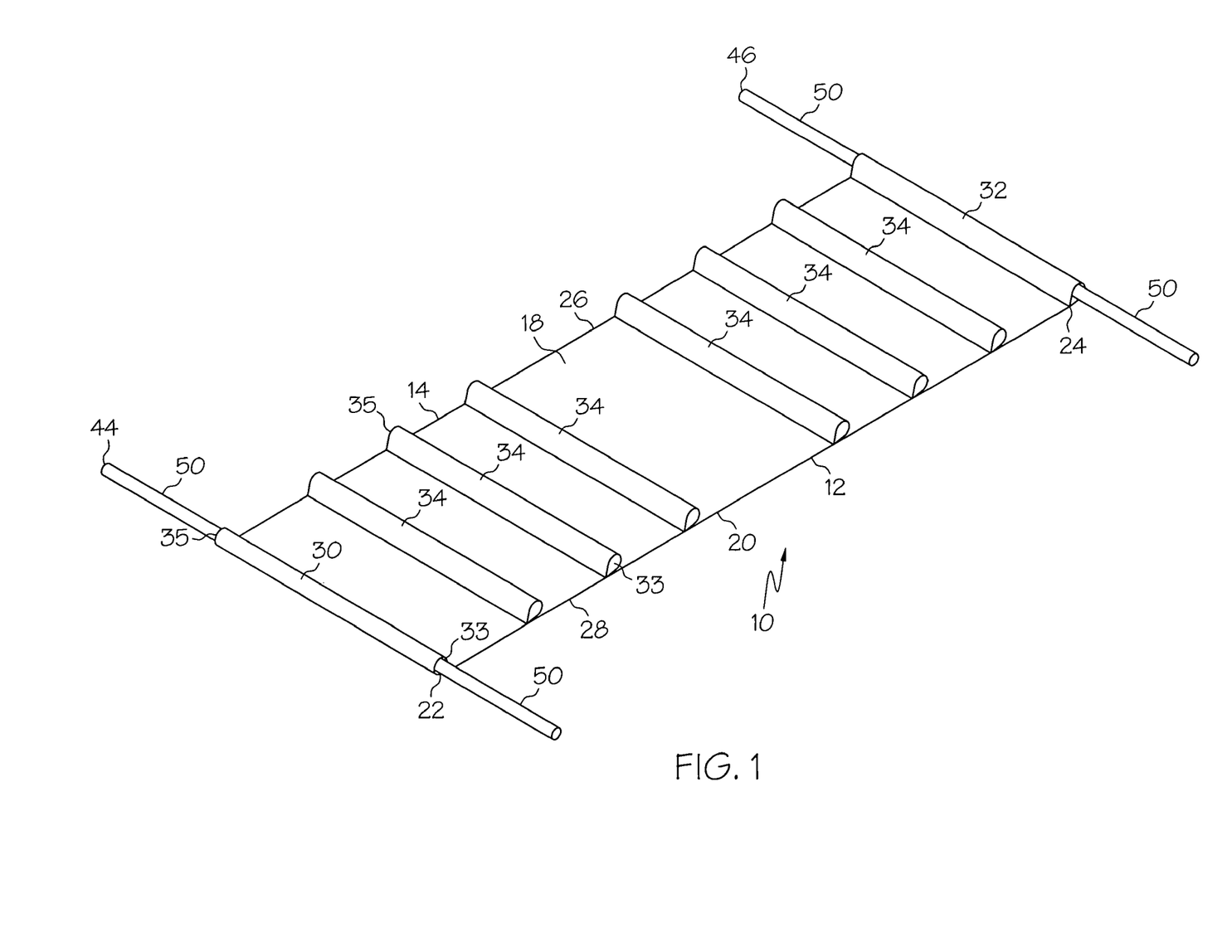
FIG. 1 is a perspective view illustration of a conformable sling that may be used for carrying objects.
Figure 2:
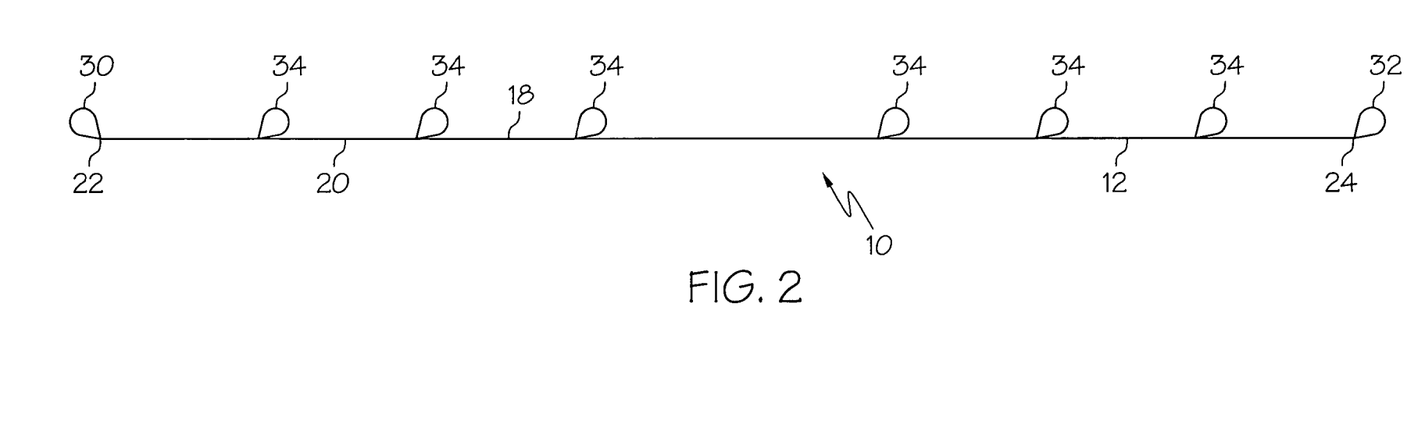
FIG. 2 is a cross-sectional side view illustration of the sling illustrated in FIG. 1.
Figure 3:
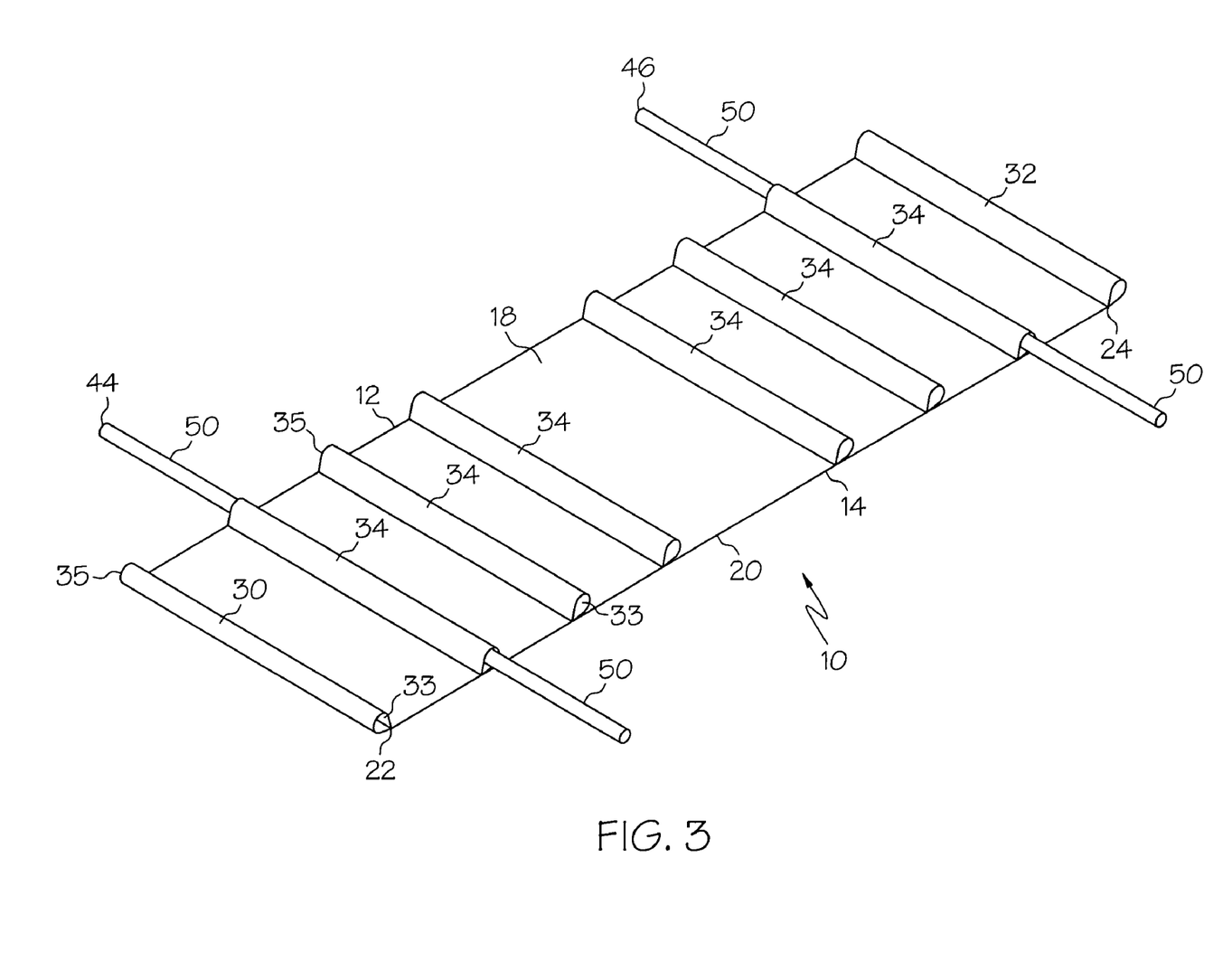
FIG. 3 is a perspective view illustration of the sling with carrying poles disposed through intermediate loops of the sling illustrated in FIG. 1.
Figure 4:
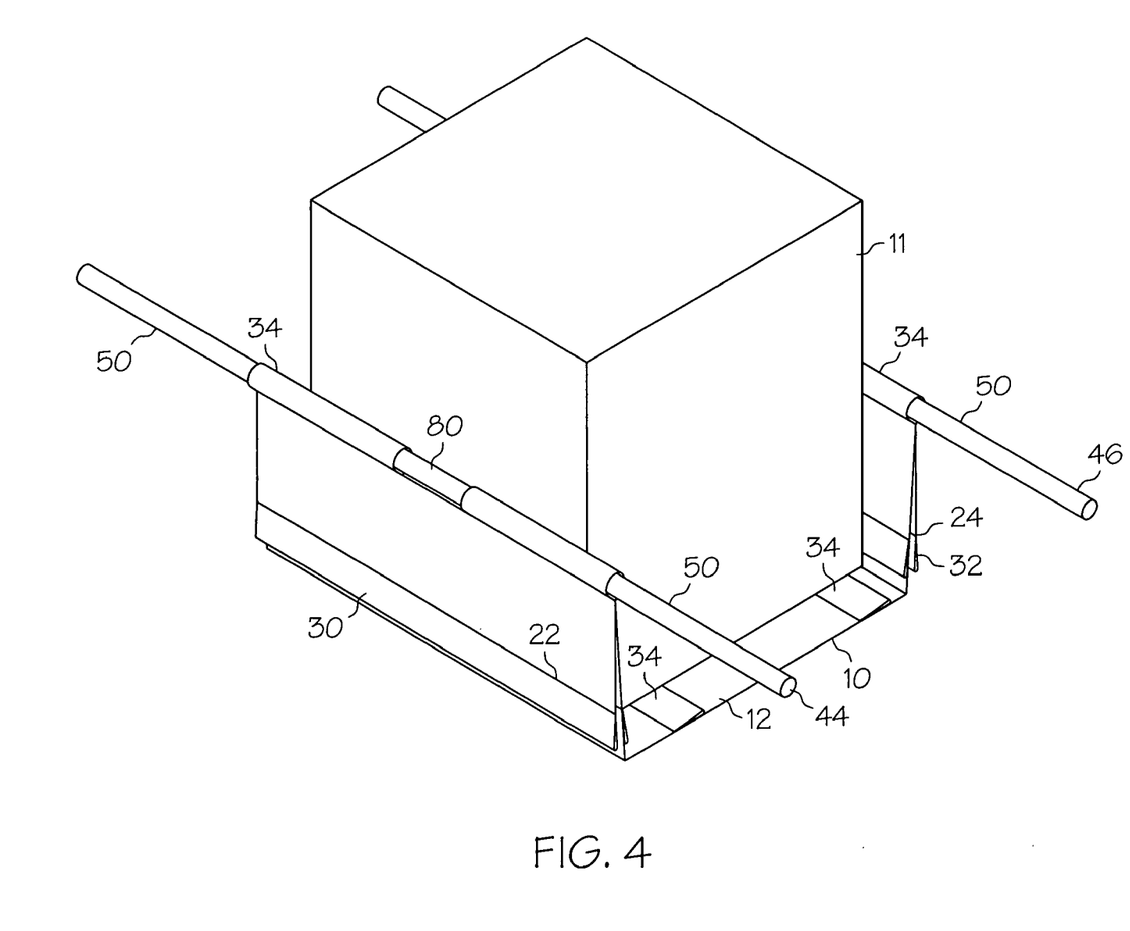
FIG. 4 is a perspective view illustration of the sling illustrated in FIG. 3 supporting a rectangular object.
Figure 5:
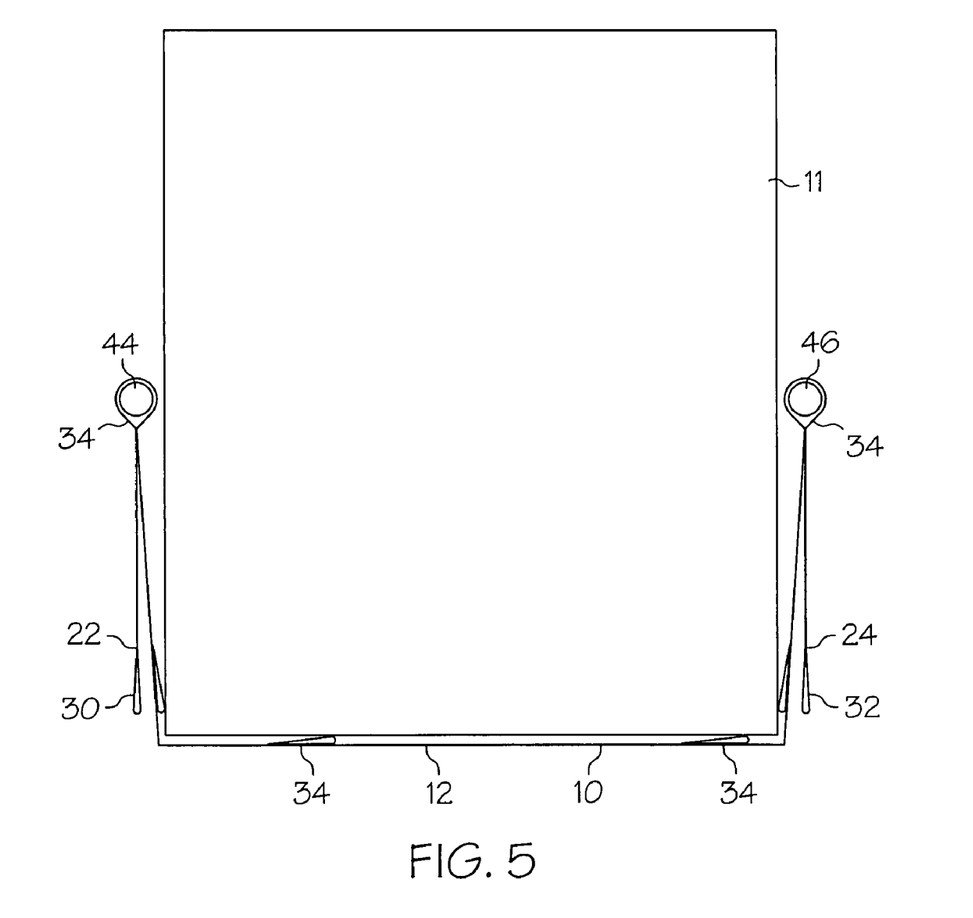
FIG. 5 is a cross-sectional view illustration of the sling supporting the rectangular object illustrated in FIG. 3.
Figure 6:
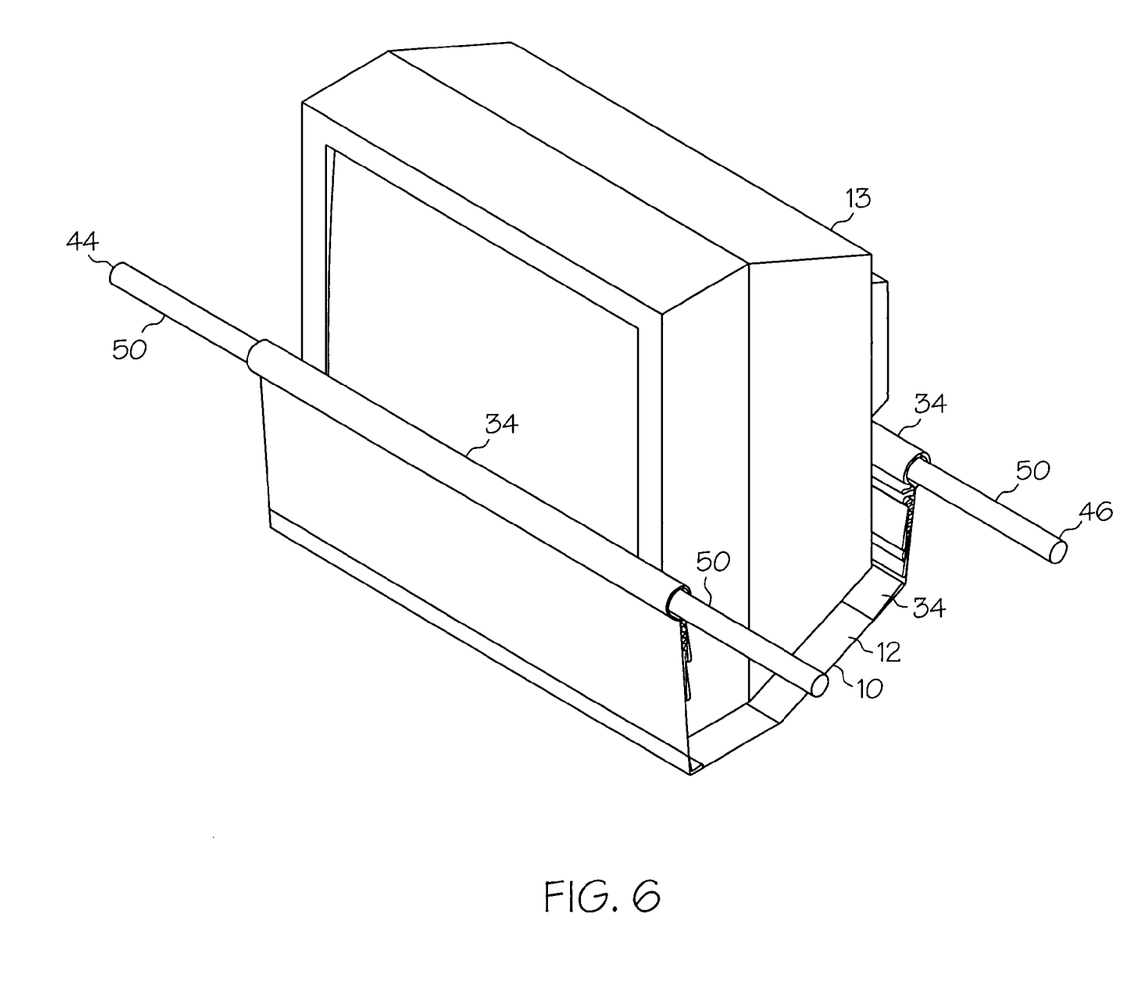
FIG. 6 is a perspective view illustration of the sling illustrated in FIG. 1 supporting an irregularly shaped object having non-square corners.
Figure 7:
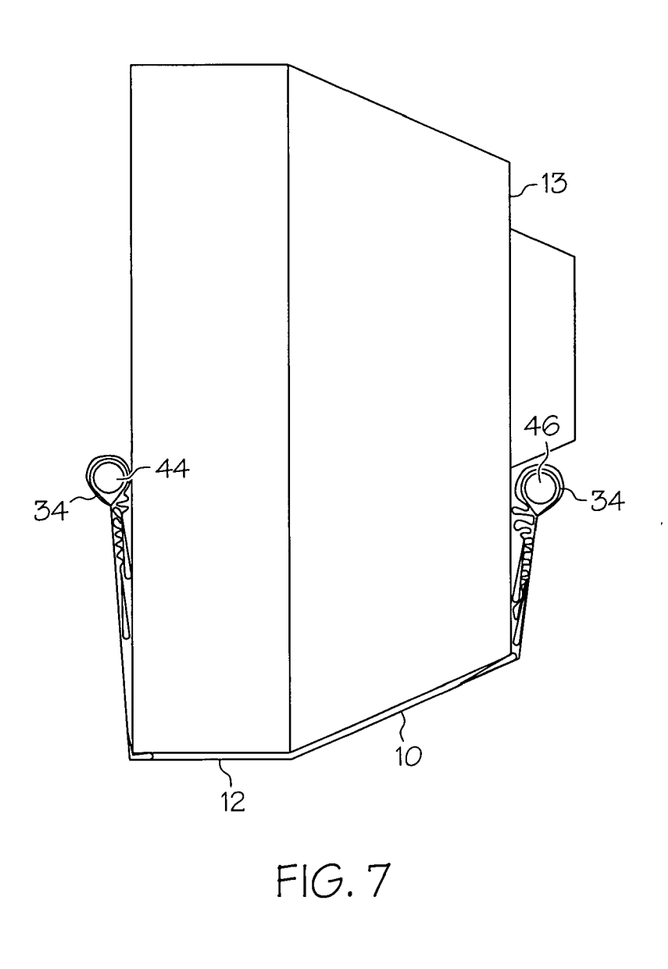
FIG. 7 is a cross-sectional view illustration of the sling supporting the irregularly shaped object illustrated in FIG. 6.

Illustrated in FIGS. 1 and 2 is an exemplary embodiment of a conformable sling 10 suitable for moving objects, particularly, heavy objects such as a rectangular box 11 illustrated in FIGS. 4 and 5. The conformable sling 10 is also particularly useful for moving heavy and irregularly shaped objects, objects having non-square corners such as a television 13 illustrated in FIGS. 6 and 7. Referring again to FIGS. 1 and 2, the conformable sling 10 includes a sheet 12 of a flexible material 14 having opposite first and second sides 18 and 20, longitudinally spaced apart transversely extending first and second side edges 22 and 24, and transversely spaced apart longitudinally extending third and fourth side edges 26 and 28. First and second edge loops 30 and 32 transversely extend along the first and second side edges 22 and 24, respectively. Intermediate loops 34 attached to the sheet 12 transversely extend across the sheet and are longitudinally spaced apart between the first and second side edges 22 and 24. Each of the loops transversely extend between transversely spaced apart first and second openings 33 and 35 of the loops. The intermediate loops 34 are substantially as long as the first and second edge loops 30 and 32. The intermediate loops 34 allow various length of the sling 10 to be used to better accommodate various objects of different weights and shapes. Suitable flexible materials for the sheet 12 include cloth, plastic, vinyl, canvas, leather, cargo netting, or similar materials. The loops may be sewn onto the sheet or otherwise attached such as by adhesives.

Figure 8:
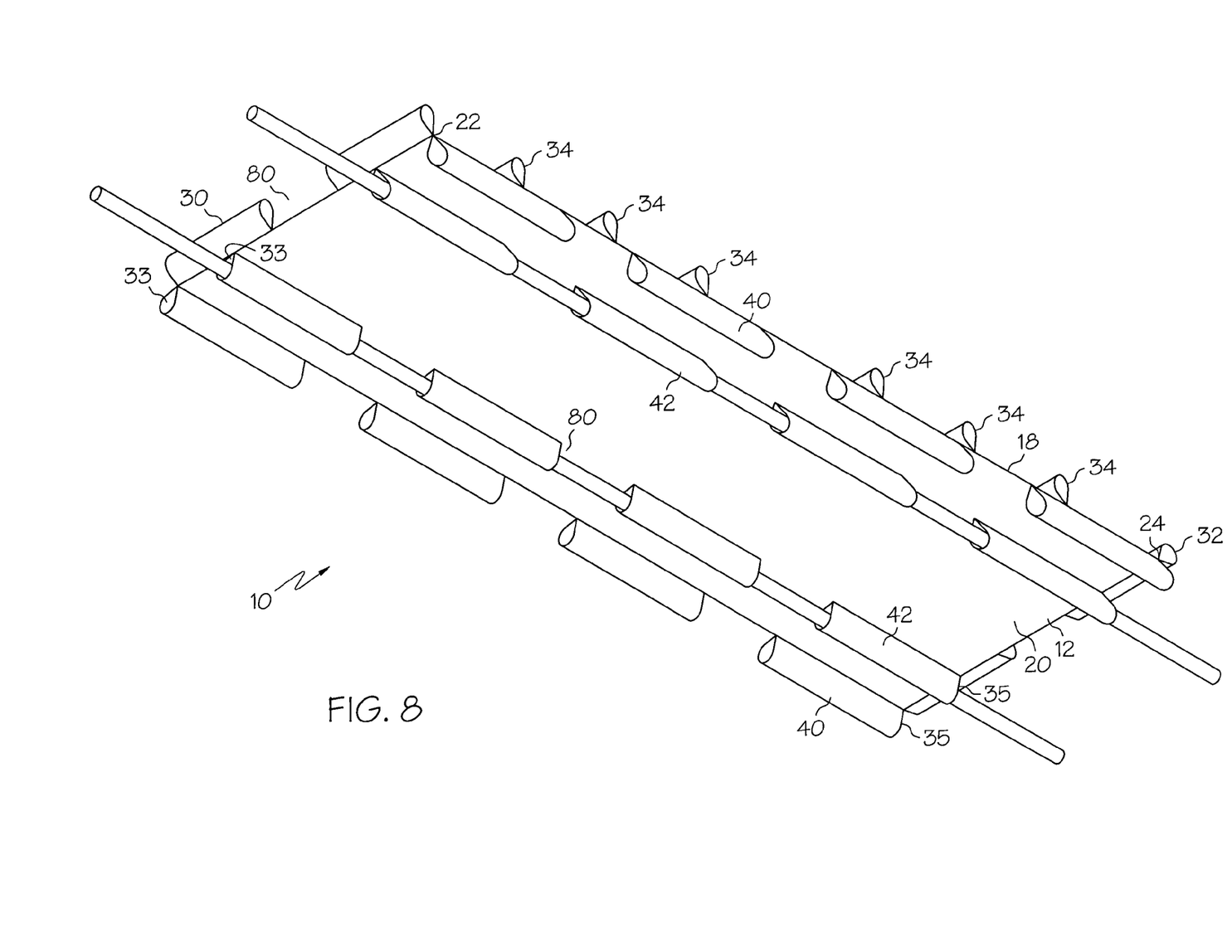
FIG. 8 is a cross-sectional side view illustration of an alternative embodiment of the sling illustrated in FIG. 1 with transversely and longitudinally extending loops on different sides of the sling.

In the exemplary embodiment of the sling 10 illustrated in FIGS. 1 and 2, the intermediate loops 34 are attached to the first side 18 of the sheet 12 illustrating that the intermediate loops 34 may all be attached to either one of the first and second sides 18 and 20. An alternative embodiment of the sheet 12 illustrated in FIG. 8 further includes longitudinally extending edge loops 40 along the longitudinally extending third and fourth side edges 26 and 28 and longitudinally extending intermediate loops 42 attached to the sheet 12 on the second side 20 and transversely spaced apart between the third and fourth side edges 26 and 28. The transversely extending intermediate loops 34 are attached to the sheet 12 on the first side 18 and the longitudinally extending intermediate loops 42 are attached to the sheet 12 on the second side 20. This form of the sling provides a means for carrying much longer objects.

The sheets 12 are illustrated herein as being rectangular in shape with the longitudinally extending third and fourth side edges 26 and 28 being longer than the transversely extending first and second side edges 22 and 24. Other more regular shapes, such as square, and irregular shapes may be used.

A first elongated element 44, exemplified by a pole herein, is disposed through a first one of the loops and a second elongated element 46 is disposed through a second one of the loops. The elongated elements 44 and 46 or poles are longer than the first and second loops and have ends that serve as handle end sections 50 transversely extending beyond the first and second loops by which the elongated elements can be grasped. The handle end sections 50 may also be offset as a means of adjusting the span distance when carrying a very wide object.

Figure 9:
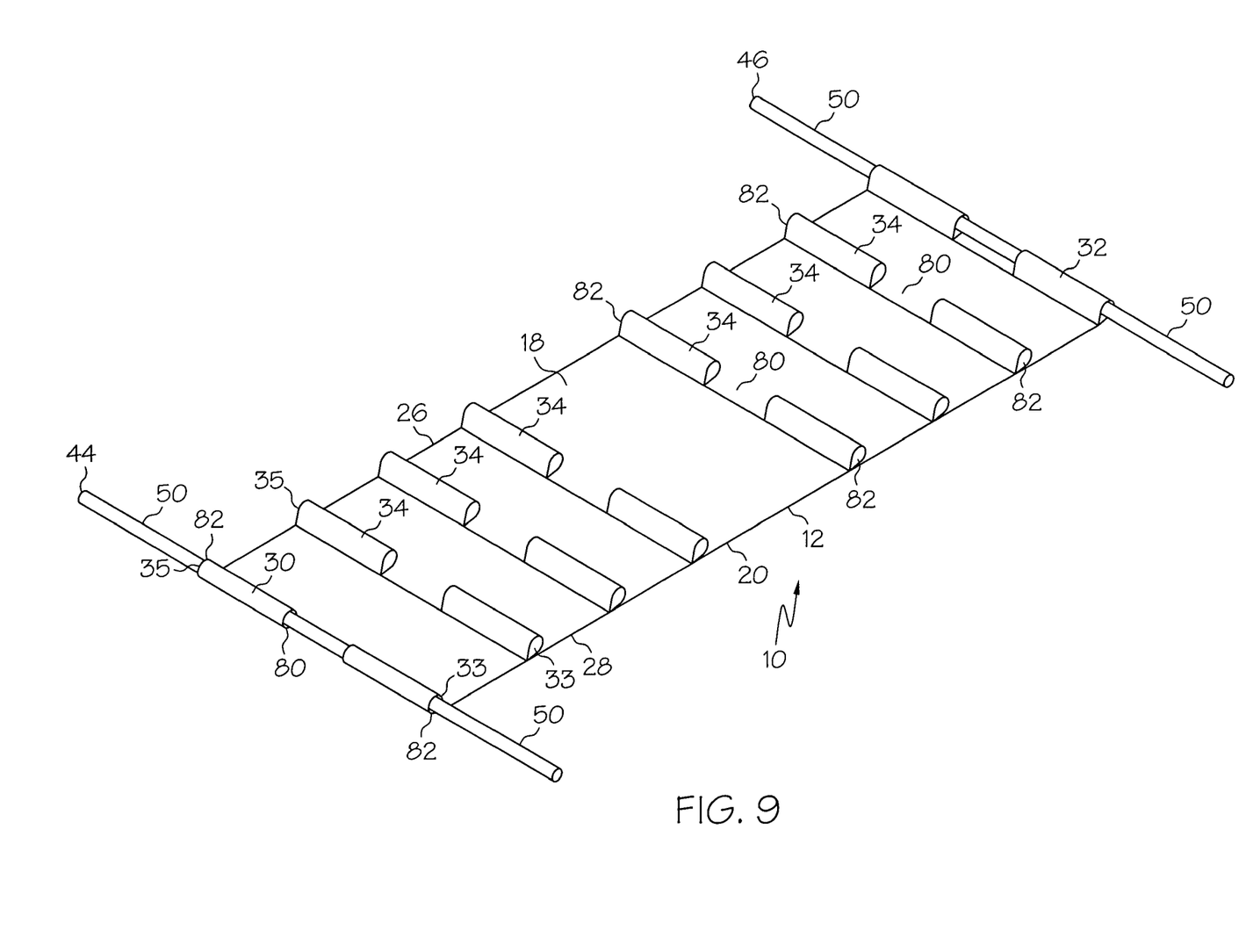
FIG. 9 is a cross-sectional side view illustration of another alternative embodiment of the sling illustrated in FIG. 1 with cut-out sections of the loops providing intermediate handle access areas to the poles.

Illustrated in FIG. 9 is an alternative embodiment of the sling 10 with cut-out sections 80 positioned between distal ends 82 of the first and second edge loops 30 and 32 and the intermediate loops 34 providing intermediate handle access areas to the poles. Among other benefits, the cut-out sections 80 allow two or more men to hold each of the poles and lift the object with the sling 10. Though only one cut-out section 80 is illustrated in each loop, two or more cut-out sections 80 may be incorporated in each of the loops.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. A sling comprising:
  a sheet of flexible material having opposite first and second sides,
  the sheet having longitudinally spaced apart transversely extending first and second side edges,
  the sheet having transversely spaced apart longitudinally extending third and fourth side edges,
  transversely extending first and second edge loops along the first and second side edges respectively,
  transversely extending intermediate loops attached to the sheet and longitudinally spaced apart between the first and second side edges,
  all of the intermediate loops being attached to the sheet on only one of the first and second sides,
  a first elongated element disposed through a first one of the loops and a second elongated element disposed through a second one of the loops, and
  the elongated elements being longer than the first and second loops and having handle end sections extending beyond the first and second loops by which the elongated elements can be grasped.

2. A sling comprising:
  a sheet of flexible material having opposite first and second sides,
  the sheet having longitudinally spaced apart transversely extending first and second side edges,
  the sheet having transversely spaced apart longitudinally extending third and fourth side edges,
  transversely extending first and second edge loops along the first and second side edges respectively,
  transversely extending intermediate loops attached to the sheet and longitudinally spaced apart between the first and second side edges,
  longitudinally extending edge loops along the third and fourth side edges,
  longitudinally extending intermediate loops transversely spaced apart between the third and fourth side edges, and
  the transversely extending intermediate loops attached to the sheet on the first side and the longitudinally extending intermediate loops attached to the sheet on the second side.

3. A sling as claimed in claim 2 further comprising a first elongated element disposed through a first one of the loops and a second elongated element disposed through a second one of the loops.

4. A sling as claimed in claim 3 further comprising the elongated elements being longer than the first and second loops and having handle end sections extending beyond the first and second loops by which the elongated elements can be grasped.

5. A sling comprising:
  a sheet of flexible material having opposite first and second sides,
  the sheet having longitudinally spaced apart transversely extending first and second side edges,
  the sheet having transversely spaced apart longitudinally extending third and fourth side edges,
  transversely extending first and second edge loops along the first and second side edges respectively,
  transversely extending intermediate loops attached to the sheet and longitudinally spaced apart between the first and second side edges,
  each of the loops extending transversely between transversely spaced apart first and second openings of the loops,
  the intermediate loops being substantially as long as the first and second edge loops,
  a first elongated element disposed through a first one of the loops and a second elongated element disposed through a second one of the loops, and
  the elongated elements being longer than the first and second loops and having handle end sections extending beyond the first and second loops by which the elongated elements can be grasped.

6. A sling comprising:
  a sheet of flexible material having opposite first and second sides,
  the sheet having longitudinally spaced apart transversely extending first and second side edges, the sheet having transversely spaced apart longitudinally extending third and fourth side edges, transversely extending first and second edge loops along the first and second side edges respectively, transversely extending intermediate loops attached to the sheet and longitudinally spaced apart between the first and second side edges, the sheet being rectangular in shape and the longitudinally extending third and fourth side edges being longer than the transversely extending first and second side edges, all of the intermediate loops being attached to the sheet on only one of the first and second sides, a first elongated element disposed through a first one of the loops and a second elongated element disposed through a second one of the loops, and the elongated elements being longer than the first and second loops and having handle end sections extending beyond the first and second loops by which the elongated elements can be grasped.

7. A sling comprising:

a sheet of flexible material having opposite first and second sides, the sheet having longitudinally spaced apart transversely extending first and second side edges, the sheet having transversely spaced apart longitudinally extending third and fourth side edges, transversely extending first and second edge loops along the first and second side edges respectively, transversely extending intermediate loops attached to the sheet and longitudinally spaced apart between the first and second side edges, the sheet being rectangular in shape and the longitudinally extending third and fourth side edges being longer than the transversely extending first and second side edges, longitudinally extending edge loops along the third and fourth side edges, longitudinally extending intermediate loops transversely spaced apart between the third and fourth side edges, and the transversely extending intermediate loops attached to the sheet on the first side and the longitudinally extending intermediate loops attached to the sheet on the second side.

8. A sling as claimed in claim 7 further comprising a first elongated element disposed through a first one of the loops and a second elongated element disposed through a second one of the loops.

9. A sling as claimed in claim 8 further comprising the elongated elements being longer than the first and second loops and having handle end sections extending beyond the first and second loops by which the elongated elements can be grasped.

10. A sling comprising:

a sheet of flexible material having opposite first and second sides, the sheet having longitudinally spaced apart transversely extending first and second side edges, the sheet having transversely spaced apart longitudinally extending third and fourth side edges, transversely extending first and second edge loops along the first and second side edges respectively, transversely extending intermediate loops attached to the sheet and longitudinally spaced apart between the first and second side edges, each of the loops extending transversely between transversely spaced apart first and second openings of the loops, the intermediate loops being substantially as long as the first and second edge loops, a first elongated element disposed through a first one of the loops and a second elongated element disposed through a second one of the loops, and at least one cut-out section positioned between distal ends of at least one of the loops.

11. A sling as claimed in claim 10 further comprising all of the intermediate loops being attached to the sheet on only one of the first and second sides.

12. A sling further comprising:

a sheet of flexible material having opposite first and second sides, the sheet having longitudinally spaced apart transversely extending first and second side edges, the sheet having transversely spaced apart longitudinally extending third and fourth side edges, transversely extending first and second edge loops along the first and second side edges respectively, transversely extending intermediate loops attached to the sheet and longitudinally spaced apart between the first and second side edges, at least one cut-out section positioned between distal ends of at least one of the loops, all of the intermediate loops being attached to the sheet on only one of the first and second sides, a first elongated element disposed through a first one of the loops and a second elongated element disposed through a second one of the loops, and the elongated elements being longer than the first and second loops and having handle end sections extending beyond the first and second loops by which the elongated elements can be grasped.

13. A sling comprising:

a sheet of flexible material having opposite first and second sides, the sheet having longitudinally spaced apart transversely extending first and second side edges, the sheet having transversely spaced apart longitudinally extending third and fourth side edges, transversely extending first and second edge loops along the first and second side edges respectively, transversely extending intermediate loops attached to the sheet and longitudinally spaced apart between the first and second side edges, the intermediate loops being substantially as long as the first and second edge loops, a first elongated element disposed through a first one of the loops and a second elongated element disposed through a second one of the loops, at least one cut-out section positioned between distal ends of at least one of the loops, and longitudinally extending edge loops along the third and fourth side edges, longitudinally extending intermediate loops transversely spaced apart between the third and fourth side edges, and the transversely extending intermediate loops attached to the sheet on the first side and the longitudinally extending intermediate loops attached to the sheet on the second side.

14. A sling as claimed in claim 13 further comprising the elongated elements being longer than the first and second loops and having handle end sections extending beyond the first and second loops by which the elongated elements can be grasped.

15. A sling comprising:

a sheet of flexible material having opposite first and second sides, the sheet having longitudinally spaced apart transversely extending first and second side edges, the sheet having transversely spaced apart longitudinally extending third and fourth side edges, transversely extending first and second edge loops along the first and second side edges respectively, transversely extending intermediate loops attached to the sheet and longitudinally spaced apart between the first and second side edges, at least one cut-out section positioned between distal ends of at least one of the loops, a first elongated element disposed through a first one of the loops and a second elongated element disposed through a second one of the loops, and the elongated elements being longer than the first and second loops and having handle end sections extending beyond the first and second loops by which the elongated elements can be grasped.

* * * * *